J. P. GILLESPIE.
Diamond-pointed Drills for Dental Use.

No. 137,434. Patented April 1, 1873.

Witnesses:
W. T. Hutchinson
Edwin J. McBain

Inventor:
James P. Gillespie
per Edw. W. Donn

UNITED STATES PATENT OFFICE.

JAMES P. GILLESPIE, OF LOUISVILLE, KENTUCKY.

IMPROVEMENT IN DIAMOND-POINTED DRILLS FOR DENTAL USE.

Specification forming part of Letters Patent No. 137,434, dated April 1, 1873; application filed July 3, 1872.

*To all whom it may concern:*

Be it known that I, JAMES P. GILLESPIE, of Louisville, in the county of Jefferson and in the State of Kentucky, have invented certain new and useful Improvements in Drills for Dental Purposes; and do hereby declare that the following is a full, clear, and exact description thereof, reference being had to the accompanying drawing and to the letters of reference marked thereon making a part of this specification.

The nature of my invention consists in diamond points so set in spring steel, or spring iron, or other spring metal as to enable the operator to cut, bore, or drill the enamel or bone of the tooth in forming cavities for filling, or to remove spots or irregularities of the teeth, and other similar operations, as also to drill or cut the mineral or artificial teeth or block of teeth, and for other dental operations where drills or chisels of steel are now and have always been used.

Figure 1:
Figure 2:
Figure 3:
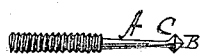
Figure 4:
Figure 5:

Figures 1, 2, 3, 4, 5 represent different forms of drills used.

In order to enable others skilled in the art to which my invention appertains to make and use the same, I will now proceed to describe its construction and operation, referring to the annexed drawing, in which the various figures show the diamond points set in different positions.

I make the necks A of the drills of such temper as that they may be bent by the operator in any direction, thereby enabling him to cut a larger cavity or hole than the actual diameter of the drill. I also set the diamonds B out on one or two, sometimes three, sides of the drill-head C, to make them under-cut when desired by the operator.

In setting the diamonds, I select suitable ones for the sized drills I desire to make, then cut out or drill-out suitable seats for them. I then drive them home in the seats or holes, and then tamp the metal firmly and closely around the diamonds so as to retain them securely in place. I make these diamond points to run either by hand or by any of the dental engines or lathes used by the dentists.

The drills heretofore used by dentists break easily or become dull with little use, and choke up, rendering them almost useless in a short time, while my diamond drills never get dull nor choke, no matter how much they may be used, and the drills do not break so easily, being so made with light temper in the necks, allowing them to bend without breaking, and thus enabling the operator to bend them at will so as to cut with the same drill a larger cavity or hole than the actual diameter of the drill-point used, which cannot be done with a hard-tempered steel drill.

My diamond points cut the enamel and dentine of the natural teeth with more rapidity and with much less pain than with instruments of steel.

The operator may also use my drill with diamond points to drill or cut the mineral or artificial teeth and other hard substances used by dentists without impairing their cutting power or properties.

Having thus fully described my invention, what I claim as new, and desire to secure by Letters Patent, is—

A dentist's drill, formed of a light-tempered steel or equivalent shank, A, with a head, C, and a diamond point, B, substantially as and for the purposes herein set forth.

In testimony that I claim the foregoing I have hereunto set my hand this 6th day of June, A. D. 1872.

J. P. GILLESPIE.

Witnesses:
 A. N. MARR,
 G. W. HALL.